(12) United States Patent
Barowski et al.

(10) Patent No.: US 9,560,387 B2
(45) Date of Patent: Jan. 31, 2017

(54) INTERFACE FOR WIRELESS DATA TRANSMISSION IN A MOTOR VEHICLE, AND COMPUTER PROGRAM PRODUCT

(75) Inventors: Peter Barowski, Rodgau (DE); Stephan Cieler, Frankfurt (DE); Carmen Freitag, Frankfurt (DE); Jürgen Leimbach, Aschaffenburg (DE); Guido Meier-Arendt, Langen (DE); Alexander Niemeyer, Babenhausen (DE); Katrin Wenzel, Alsbach-Hähnlein (DE)

(73) Assignee: Continental Automotive GmbH, Hannover (DE)

( * ) Notice: Subject to any disclaimer, the term of this patent is extended or adjusted under 35 U.S.C. 154(b) by 10 days.

(21) Appl. No.: 14/114,082

(22) PCT Filed: Mar. 28, 2012

(86) PCT No.: PCT/EP2012/055487
§ 371 (c)(1),
(2), (4) Date: Dec. 4, 2013

(87) PCT Pub. No.: WO2012/146455
PCT Pub. Date: Nov. 1, 2012

(65) Prior Publication Data
US 2014/0082676 A1 Mar. 20, 2014

(30) Foreign Application Priority Data

Apr. 26, 2011 (DE) .................. 10 2011 018 555

(51) Int. Cl.
*H04N 21/214* (2011.01)
*B60K 37/06* (2006.01)
(Continued)

(52) U.S. Cl.
CPC ............. *H04N 21/214* (2013.01); *B60K 37/06* (2013.01); *G06F 1/1643* (2013.01);
(Continued)

(58) Field of Classification Search
CPC ...................... H04N 21/2146; H04N 21/41422
See application file for complete search history.

(56) References Cited

U.S. PATENT DOCUMENTS

2005/0064814 A1* 3/2005 Matsuo et al. ............... 455/41.1
2006/0168627 A1* 7/2006 Zeinstra et al. ................ 725/75
(Continued)

FOREIGN PATENT DOCUMENTS

CN  101496380  7/2009
CN  101595492  12/2009
(Continued)

*Primary Examiner* — Nasser Goodarzi
*Assistant Examiner* — Adil Ocak
(74) *Attorney, Agent, or Firm* — Cozen O'Connor

(57) ABSTRACT

An interface for data transmission in a motor vehicle between a mobile data device (6) having a computation unit and an information display (4) in the motor vehicle is provided. The mobile data device (6) and the central information display (4) can be connected to one another by wireless communication, and the screen content of the mobile data device (6) can be presented on the information display (4). Provision is made for the computation unit of the mobile data device (6) to be set up to use the wireless communication to actuate the information display (4) in the motor vehicle by video signals, and for the computation unit of the information display (4) to be set up to present the video signals received from the mobile data device (6).

13 Claims, 2 Drawing Sheets

(51) Int. Cl.
*G06F 1/16* (2006.01)
*G06F 3/01* (2006.01)
*G06F 3/14* (2006.01)

(52) U.S. Cl.
CPC ............ *G06F 1/1694* (2013.01); *G06F 3/017* (2013.01); *G06F 3/1454* (2013.01); *B60K 2350/1004* (2013.01); *B60K 2350/1008* (2013.01); *B60K 2350/352* (2013.01); *B60K 2350/357* (2013.01); *B60K 2350/906* (2013.01); *G09G 2370/16* (2013.01); *G09G 2380/10* (2013.01)

(56) References Cited

U.S. PATENT DOCUMENTS

| | | |
|---|---|---|
| 2007/0124775 A1* | 5/2007 | DaCosta ........................ 725/62 |
| 2008/0133084 A1 | 6/2008 | Weinmann et al. |
| 2009/0027332 A1 | 1/2009 | Cieler et al. |
| 2009/0248820 A1 | 10/2009 | Basir et al. |
| 2009/0262074 A1 | 10/2009 | Nasiri et al. |
| 2009/0309846 A1 | 12/2009 | Trachtenberg et al. |
| 2011/0283334 A1* | 11/2011 | Choi et al. ................... 725/148 |
| 2011/0319173 A1* | 12/2011 | Backer et al. ................. 463/42 |

FOREIGN PATENT DOCUMENTS

| | | |
|---|---|---|
| CN | 201365309 | 12/2009 |
| DE | 10100648 | 7/2002 |
| EP | 2 045 999 | 4/2009 |
| WO | WO 01/94156 A2 | 12/2001 |
| WO | WO 2006/125515 A1 | 11/2006 |
| WO | WO 2009/129423 | 10/2009 |
| WO | WO 2010/114373 A1 | 10/2010 |

* cited by examiner

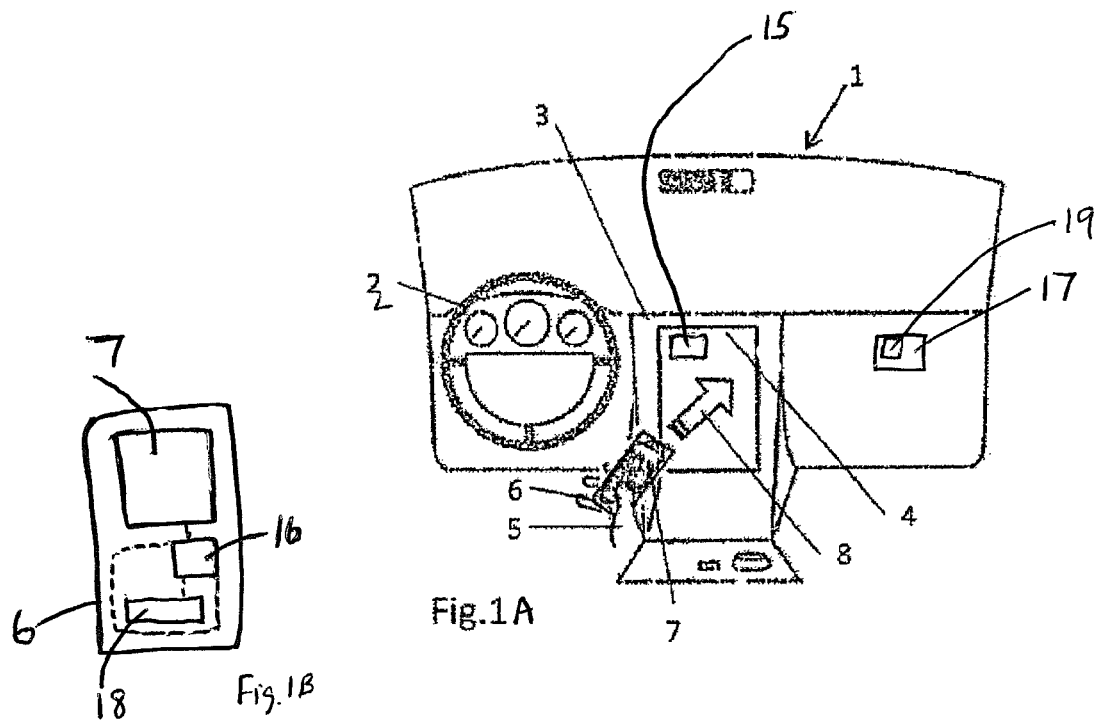
Fig.1A
Fig.1B
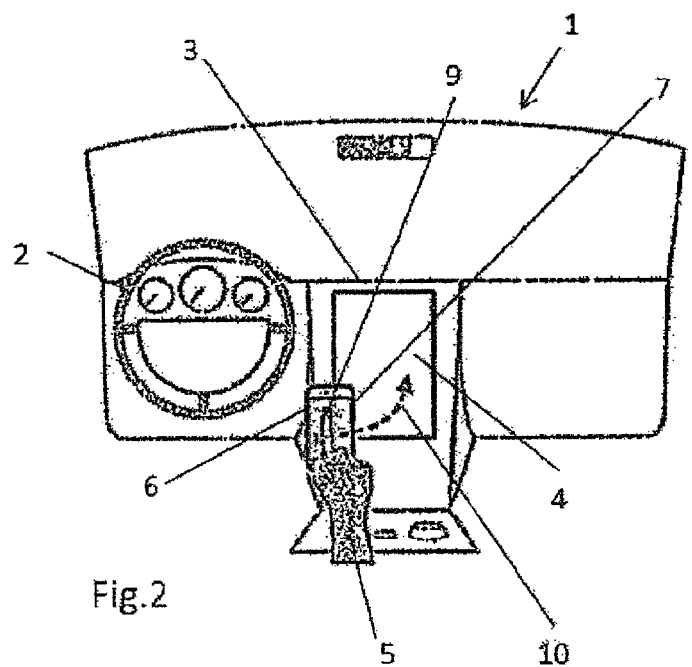
Fig.2

INTERFACE FOR WIRELESS DATA TRANSMISSION IN A MOTOR VEHICLE, AND COMPUTER PROGRAM PRODUCT

CROSS-REFERENCE TO RELATED APPLICATIONS

This is a U.S. national stage of application No. PCT/EP2012/055487, filed on 28 Mar. 2012, which claims priority to the German Application No.: 10 2011 018 555.0, filed: 26 Apr. 2011, the content of both incorporated herein by reference.

BACKGROUND OF THE INVENTION

1. Field of the Invention

The invention relates to an interface for data transmission in a motor vehicle between a mobile data appliance having a computation unit, particularly a pocket computer, mobile telephone, smartphone or the like, and an information display in the motor vehicle, particularly the display of a human-machine interface (HMI) of a vehicle communication unit, a headup display projected onto the windshield of the vehicle, for example, an entertainment display arranged at the front of the vehicle, for example on the backrests of the front seats, or other displays arranged in the vehicle. One form of application that is particularly preferred in accordance with the invention provides for the presentation on the central information display of the vehicle. In addition, a computer program product that is provided for setting up the interface is described.

2. Prior Art

For purposes of data transmission, mobile data appliances and information displays can be connected to one another by wireless communication, for example Bluetooth or WLAN or the like, as a result of which the screen content of the mobile data appliance can be presented on the information display.

In principle, it is known to present the content of a mobile telephone on the display of another computation unit, for example even in a motor vehicle. Doing this requires separate user inputs on the mobile data appliance and/or in the computation unit to which the display on which the data of the mobile data appliance are intended to be presented is connected.

However, this is complex and because of this complexity the function is actually used relatively rarely by users.

Particularly in motor vehicles, this is disadvantageous because in that environment the time available for such inputs is limited. For safety reasons, provision is frequently made for such inputs to be able to be made only while the vehicle is at a standstill. This involves the use of red phases of traffic lights, for example, for the driver of the vehicle. However, the user of a mobile telephone or other mobile data appliance usually has to work through a complex menu structure in order to initiate the relevant commands for presenting the screen content of the mobile data appliance on a display that is connected to an external computation unit.

EP 2 045 999 A1 discloses equipping a mobile telephone with an acceleration sensor and displaying and selecting data to be transmitted on a display. The data transmission itself, via an infrared data link, is initiated, according to the teaching of EP 2 045 999 A1, when the mobile telephone is held at a particular angle that is detected by the acceleration sensor. However, this does not involve transmission of the graphical screen presentation. Instead, only a transmission process for previously selected data is initiated.

US 2009/0309846 A1 discloses a communication system in which information presented on an interactive display can be transmitted to another interactive display via a communication network. This can involve the provision of a motion sensor that, for example, captures the hand movement of a user in order to transmit the screen content presented on the screen in the direction of another screen. This makes it simple for many persons on different interactive screens to work together and distribute contents that are presented on the interactive display. The distribution is accomplished by a central server to which the various screens are connected. This is complicated, since the server needs to be configured beforehand and the screens that are to be used need to be registered on the server.

Such management is not suitable for spontaneous transmission of screen content from one display to another without the central server of the system needing to be set up beforehand.

Finally, US 2009/0027332 A1 discloses a method for controlling the screen contents of a vehicle display, which control is effected by the user by gestures, these gestures being recorded and evaluated using an image recording system. Such screen control in motor vehicles is technically complex, since appropriate cameras need to be installed in the cockpit of a vehicle and evaluated using image processing. Such processing requires some time, which means that gesture control controlled by image evaluation is usually sluggish. Further, a problem arises when distinguishing between gestures that are intended for controlling the display and normal gestures, for example during a conversation with another person in the vehicle.

SUMMARY OF THE INVENTION

Against the background of this prior art, it is an object of the present invention is to provide the user with an opportunity to easily present screen contents from a mobile data appliance in an information display in the vehicle, the aim preferably being for various displays to be able to be selected.

In accordance with an aspect of the present invention, this object is achieved by an interface in which the computation unit of the mobile data appliance is set up to use wireless communication to actuate the information display in the motor vehicle directly by means of video signals. At the same time, the computation unit of the information display is set up to present the video signals received from the mobile data appliance.

In accordance with an aspect of the present invention, instead of transmitting data that subsequently needs to be evaluated by a computation unit connected to the information display and converted into video signals for actuating the information display, the invention uses wireless communication for direct communication between the mobile data appliance, as a master, and the information display as a slave. This direct master-slave communication is used directly to transmit the video signals that are to be presented. This master-slave connection can easily be set up on an ad hoc basis and caters for direct presentation of screen contents from the mobile data appliance on the information display of the vehicle.

According to an aspect of the invention, the computation unit of the information display is configured to receive the video signals from the computation unit of the mobile data appliance and to present the video signals on the information display. The computation unit thus merely adopts the function of a graphics driver for directly actuating the screen without the video signal itself needing to be produced by the computation unit. Thus, the screen content is transmitted from the mobile data appliance to the information display of the vehicle, rather than data from which the screen content first needs to be ascertained by a separate computation unit. This can be understood by the usage of the term "video signal" in the present application. In accordance with an aspect of the invention, there is no need for transmission to a central computer of the vehicle, which conditions the data and then selects and actuates a desired display. Instead, the invention provides a distributed system in which the computation unit of the mobile data appliance actuates one or more information displays of the vehicle directly in a master-slave mode.

In this case, the computation unit of the information display can, according to an aspect of the invention, match the display resolution from the mobile data appliance to the information display. To this end, when the wireless communication is set up and/or when the mobile data appliance and the information display are initialized, the resolution of a presentation on the mobile data appliance can be transmitted to the computation unit of the information display, which then performs matching for the resolution.

In another aspect, the data is transmitted by standard wireless communication provided within the context of the communication unit, with Bluetooth of WLAN preferably being used.

In order to allow intuitive operator control of the interface, the computation unit of the mobile data appliance may, according to an aspect of the invention, be set up to initiate the wireless communication for transmitting the video signals by a touch interface of the mobile data appliance. In principle, the transmission of the video signals could also be initiated automatically when the mobile data appliance is introduced into and/or registered in the motor vehicle, and could be, for example, interrupted by a touch interface of the mobile data appliance.

According to one variant of the present invention, the video signals are presented on a preselected information display of the vehicle when the wireless communication for transmitting the video signals is initiated. This simplifies the refinement of the touch interface, because when the touch interface is initiated it is merely necessary to decide whether or not the wireless communication for transmitting the video signals needs to be initiated. The selected information display of the vehicle is certain from the outset. In particular, this may be a central information display, for example in the center console of the vehicle, to which both the driver and the passenger have easy access. It is also usually possible for front-seat passengers in the vehicle to view this display.

According to another aspect of the present invention, the computation unit of the mobile data appliance is configured to initiate the wireless communication in the event of a directional movement on a touch display of the mobile data appliance in the direction of the information display of the vehicle, wherein preferably a movement from the center of the touch display up to the edge of the touch display, in the direction of the information display to be selected, needs to be performed so that the computation unit of the mobile data appliance understand this as a command for initiating the wireless communication. Such differentiation is necessary in order to distinguish the command for initiating the wireless communication of the video signals from the normal operator control of the touch display of the mobile appliance.

Alternatively or in addition, the computation unit of the mobile data appliance may be configured to initiate the wireless communication in the event of a directional movement of the entire mobile data appliance, which can be established by acceleration sensors arranged in the mobile data appliance, in the direction of the information display of the vehicle. This gesture control is particularly intuitive, because the mobile data appliance simply needs to be moved in the direction of the information display of the vehicle, the movement preferably needing to be detected as an abrupt displacement of the appliance. This abrupt displacement is distinguished by a rapid initial acceleration and a then essentially uniform movement with an abrupt stop. Such a sequence of movement can easily be captured by acceleration sensors, which, in addition to the pure movement sequence, can frequently also capture a direction of movement—at least relative to a preferential axis of the mobile data appliance. This can be used to distinguish between various information displays in the vehicle. Without this decision, it is merely possible for the wireless communication as such to be initiated when a correspondingly directional movement is established.

Preferably, in accordance with an aspect of the present invention, the computation unit of the mobile data appliance is configured to capture the direction, speed, acceleration and/or movement on the touch display and/or of the mobile data appliance as a whole and to initiate the wireless communication for transmitting the video signals when threshold values and/or a combination of various threshold values for the direction, acceleration and/or duration of the movement is/are exceeded. The stipulation of threshold values and/or the combination of various individual threshold values allows a reliable distinction to be drawn between the directional movement of a finger on the touch display, or the whole mobile appliance, and random movements, for example as a result of vibrations in the vehicle.

According to an aspect of the invention, the direction for a particular information display may have been input in the computation unit of the mobile data appliance. This can be accomplished by a program application in firmly prescribed form (such as, e.g., a non-transitory computer-readable medium) and, by way of example, making reference to the driver's seat, with particular direction intervals being firmly assigned to various information displays in the vehicle. A further option for direction assignment involves the computation unit of the mobile data appliance being configured to recognize connection to a wireless communication system of the motor vehicle and to present on the display, for example a touch display, of the mobile data appliance a frame in which the image content of the mobile data appliance is displayed and on which information displays that are available for wireless communication of the video signals are displayed. According to the invention, a movement by the mobile data appliance in the direction of the frame section assigned to the respective information display, or movement of the finger on the touch display toward this frame section, can then prompt initiation of the inventive communication for transmitting the video signals. This has the advantage that the intuitive movement is supported by additional statements on the information display.

According to an aspect of the invention, data can also be transferred bidirectionally from the mobile appliance to the information display and in the opposite direction. To continue this idea, the computation unit of one or more information displays and/or the computation unit of a communication unit in the motor vehicle, for example a multimedia unit having a plurality of connected information displays, may be configured to use the wireless communication to transmit a self-executing application program to the computation unit of a mobile data appliance, which program is programmed as an application program to set up the computation unit of the mobile data appliance, when the mobile data appliance registers on the wireless communication system of the vehicle, in order to carry out the method described above. Within the context of this application program, the mobile data appliance can be notified particularly of the available information displays in the vehicle, the touch interface of the mobile data appliance can be initialized and/or the frame described previously can be presented on the display of the mobile data appliance.

In order to further improve direction recognition, in accordance with an aspect the invention may provide for the position of the mobile data appliance to be intended to be captured within the vehicle. This can be accomplished by the computation unit of a communication unit of the vehicle, which communication unit controls a transmitter and a receiver in the wireless communication system, being set up to ascertain the position of the mobile data appliance in the motor vehicle from the reception field strength of the signals received from the mobile data appliance. A movement by the mobile telephone can additionally prompt capture of the start and end of the movement. As a result, it is possible to ascertain the direction of the movement with respect to an arrangement of the information displays that is known in the motor vehicle.

In accordance with another aspect of the invention, the interface can be used to interchange data by data signals also being transmitted in addition to the video signals. In particular, provision may be made for the interface to also provide options for data transmission, particularly files, when wireless communication for presenting the video signals has been set up. To this end, the interface can display on the information display an appropriate command structure that can be called, by the user, on the information display. As a result, it is not absolutely necessary to produce an actual network structure between the computation unit of the mobile data appliance and the computation unit of the information display, since the relevant data transmission functionality is incorporated in the interface. Alternatively, a conventional network connection for transmitting any data may be utilized. However, in contrast to the solution described previously, this requires more precise knowledge of the various systems that are to be connected to one another.

The invention also relates to a computer program e.g., stored in a non-transitory computer-readable medium, having program code for setting up an interface of a computation unit of a mobile data appliance to actuate an information display in a motor vehicle by transmission of video signals using wireless communication by a wireless communication system of a motor vehicle and for setting up the computation unit of the information display to present the video signals received from the mobile data appliance, particularly the aforementioned master-slave communication, in which the information display is actuated directly by video signals for the mobile data appliance. According to the invention, the computer program stored on the non-transitory computer-readable medium is designed to set up the interface described previously.

To this end, the computation unit of the mobile data appliance is preferably set up as a master and the computation unit of the information display in question is set up as a slave.

According to one particularly preferred embodiment, the program portion is designed to set up the computation unit of the mobile data appliance as a piece of self-executing application software that is transmitted to the computation unit of the mobile data appliance via the wireless communication system of the motor vehicle, for example when the data appliance registers on the wireless communication system of the motor vehicle.

The present invention allows a seamless transition between mobile data appliances and information systems in the motor vehicle, with operator control of the overall system being easy to learn and intuitive. This increases acceptance by the user, which means that he will gladly use the presentation of a display from his mobile data appliance on the motor vehicle and, by way of example, can also use it to display internet contents on the screen of the motor vehicle clearly, even if the motor vehicle itself with the connected computation system has no access to the internet.

BRIEF DESCRIPTION OF THE DRAWINGS

Further features, advantages and application options of the present invention also emerge from the description of exemplary embodiments that follows and the drawings. In this case, all features that are described and/or presented in graphical form, alone or in any combination, form a part of the subject matter of the present invention, including regardless of their summary in the claims or the back-references therein.

In the drawings:

FIG. 1A is a diagram that schematically shows the interface according to the invention for transmitting video signals from a mobile data appliance to an information display according to a first embodiment;

FIG. 1B is a diagram that schematically shows the display and computation unit of the mobile data appliance;

FIG. 2 is a diagram that schematically shows an interface according to the invention for transmitting video signals from a mobile data appliance to an information display according to a second embodiment.

DETAILED DESCRIPTION OF THE PRESENTLY PREFERRED EMBODIMENTS

Figure 3:
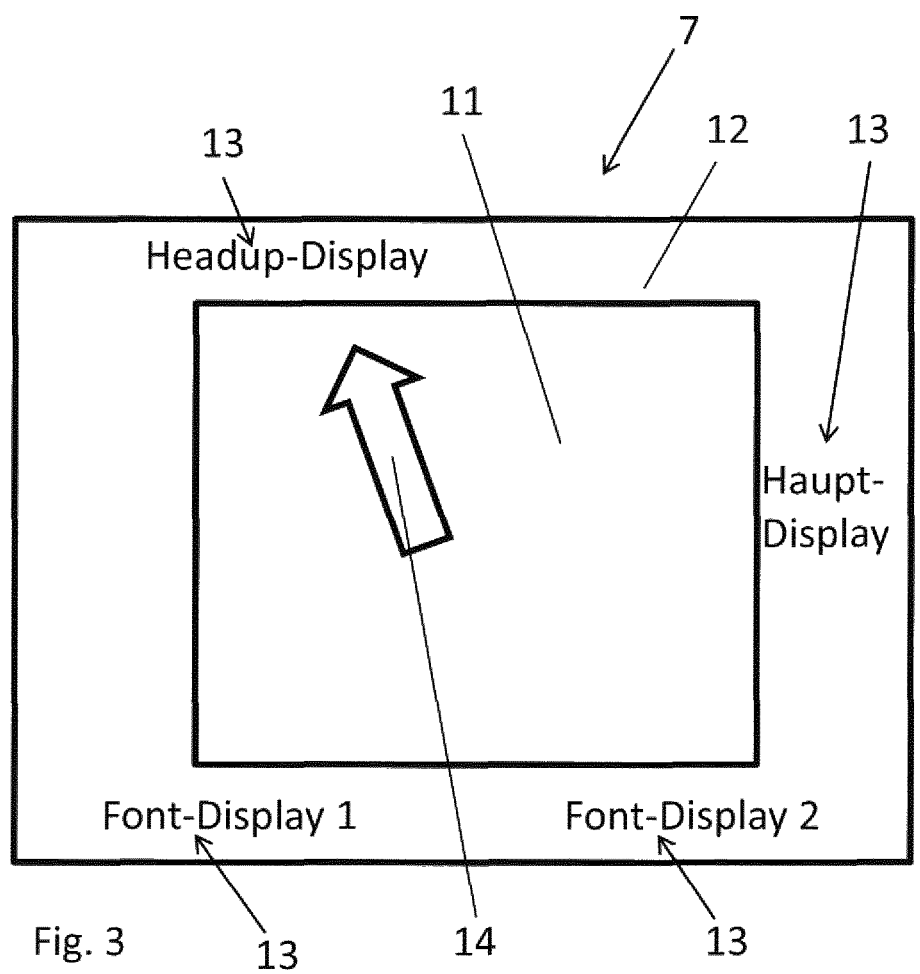
FIG. 3 is a diagram that schematically shows the display of a mobile data appliance with the implemented interface according to the invention.

FIG. 1A schematically shows a vehicle cockpit 1, with a steering wheel 2 in the general vicinity of the driver's seat and a center console 3 that contains a central information display 4 for the vehicle. The driver of the motor vehicle, of whom just one hand 5 is schematically shown, is holding a mobile data appliance 6 with a display 7, in the form of a smartphone.

Between the mobile data appliance 6 and the information display 4, wireless communication, facilitated by a communication unit 17 having a computation 19, takes place that is used to present the screen content (i.e. the video signal) from the display 7 of the mobile data appliance 6 on the information display 4. To this end, a computation unit 16 of the mobile data appliance 6, shown schematically in FIG. 1B, is set up to use the wireless communication to actuate the information display 4 of the motor vehicle by video signals. Accordingly, the computation unit 15 of the information display 4 is configured to present the video signals received from the mobile data appliance 6. The wireless communication between the mobile data appliance 6 and the information display 4 is set up as a unidirectional or bidirectional master-slave communication, as a result of which the mobile data appliance 6 actuates the information display directly.

In order to initiate the wireless communication for transmitting the video signals in accordance with the first embodiment, the mobile data appliance 6 has a touch interface. In the example shown in FIG. 1A, the touch interface is implemented in the computation unit of the mobile data appliance 6 by virtue of the wireless communication being initiated in the event of a directional movement by the whole mobile data appliance 6 in the direction of the information display 4 of the vehicle. This movement, which is preferably very uniform movement with an abrupt start and end, is captured by acceleration sensors 18 in the mobile data appliance 6. This abrupt displacement of the mobile data appliance 6 is symbolized by the arrow 8.

As soon as an acceleration sensor 18 in the mobile data appliance 6 detects such a movement 8 while the data appliance 6 is in the motor vehicle, the screen content of the display 7 of the mobile data appliance 6 is transmitted by means of wireless communication as a video signal to the information display 4, the computation unit 15 of which is configured and programmed to present this screen content transmitted in the video signal on the information display 4.

FIG. 2 shows the same cockpit 1 as in FIG. 1A, the precise description of which can therefore be dispensed with. The mobile data appliance 6 in the form of a smartphone is in a holder—not visible—on the center console 3 of the vehicle. The hand of the driver 4 uses the finger 9 to operate the display 7—in the form of a touch display—of the mobile data appliance 6, with a movement 10 by the finger occurring from the center of the display 7 toward the edge of the display 7 of the mobile data appliance 6 in the direction of the information display 4. This movement 10 is preferably also meant to be in the form of very uniform movement from the center of the touch display toward the edge, with the movement starting abruptly in the center and occurring in a uniform movement up to the edge of the display, as a result of which the sensitive area of the display 7 is abruptly left.

This starts the interface according to the invention that allows the data transmission of the video signal from the mobile data appliance 6 to the information display 4, as a result of which the screen content of the display 7 of the mobile data appliance 6 is subsequently presented on the information display 4.

The two touch interfaces of the mobile data appliance 6 that are shown in FIGS. 1A and 2 may, according to the invention, be implemented in the mobile data appliance 6 simultaneously, by virtue of which the user can intuitively make use between the two gestures for initiating the wireless communication for transmitting the video signal (i.e. the screen content).

FIG. 3 is a diagram that schematically shows the display 7 of the mobile data appliance 6 in detail following setup of the touch interface according to a further embodiment, which can be combined with the embodiments described previously. According to the invention, the touch interface of the mobile data appliance 6 can be started automatically, for example, as soon as the mobile data appliance 6 is taken into the motor vehicle and is connected to the wireless communication system of the vehicle.

Starting the touch interface reduces the display area 11 for the actual screen content of the display 7 of the mobile data appliance 6 and surrounds it with a frame 12 on which display items 13 are presented. These display items 13 indicate the information displays 4 that are available in the vehicle and on which the screen content of the display 7 of the mobile data appliance 6 can be presented. A directional movement in the direction of the respective display items, whether by movement of the finger 9 from the center of the display area 11 in the direction of the display item 13 or movement of the whole mobile data appliance in this direction, starting from the imaginary center of the display area 11, initiates the wireless communication according to the invention for transmitting the video signals. This movement is shown by the arrow 14.

The exemplary embodiments described are merely exemplary implementations of the interface according to the invention in order to transmit video signals from the display 7 of a mobile data appliance 6 to an information display 4 of a vehicle. The invention is not limited to these specific embodiments.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for data transmission in a motor vehicle, the system comprising:
   a communication unit (17) of the motor vehicle configured to facilitate wireless communication in the motor vehicle;
   a mobile data appliance (6) having a display (7) and a computation unit (16); and
   one or more information displays (4) in the motor vehicle, the one or more information displays (4) having a computation unit (15), the mobile data appliance (6) and the one or more information displays (4) each being configured to cooperate with one another to provide an interface therebetween,
   wherein the mobile data appliance (6) and the one or more information displays (4) are each configured so as to be wirelessly connectable to one another such that the screen content of the mobile data appliance (6) is presentable on the one or more information displays (4),
   wherein the computation unit (16) of the mobile data appliance (6) is configured to use the wireless communication to actuate the one or more information displays (4) in the motor vehicle by transmitting video signals corresponding to the screen content of the mobile data appliance (6) to the one or more information displays (4),
   wherein the computation unit (15) of the one or more information displays (4) is configured to present for display the video signals received from the mobile data appliance (6), and
   wherein the computation unit (16) of the mobile data appliance (6) is configured to display on the mobile data appliance a reduced area (11) that presents the actual screen content of the display (7) of the mobile data appliance and a frame (12) surrounding the reduced area (11), and to display within the surrounding frame (12) one or more display items (13), each of the one or more display items (13) corresponding to at least a respective one of the one or more information displays (4), and to initiate the wireless communication to actuate at least one of the one or more information displays (4) in the motor vehicle by transmitting the video signals corresponding to the screen content of the mobile data appliance (6) to the one or more information displays (4) corresponding to the one or more display items (13) in the frame (12) in the event of a directional movement of the entire mobile data appliance (6) in the direction of the one or more display items (13) corresponding to the one or more information displays (4) of the vehicle, the directional movement of the entire mobile data appliance that initiates the wireless transmission:

(a) being established by acceleration sensors (18) arranged in the mobile data appliance (6), and (b) being in the direction of the respective display item (13) that corresponds to a respective information display (4) of the vehicle.

2. The system as claimed in claim 1, wherein the computation unit (16) of the mobile data appliance (6) is configured to initiate the wireless communication for transmitting the video signals by a touch interface of the mobile data appliance (6).

3. The system as claimed in claim 2, wherein the computation unit (15) of the one or more information displays (4) is configured to present for display the video signals transmitted by the mobile data appliance (6) when the wireless communication for transmitting the video signals is initiated.

4. The system as claimed in claim 2, wherein the display (7) of the mobile data appliance (6) is a touch display, and wherein the computation unit (16) of the mobile data appliance (6) is configured to initiate the wireless communication in the event of a directional movement on the touch display (7) of the mobile data appliance (6) in the direction of the one or more information displays (4) of the vehicle.

5. The system as claimed in claim 4, wherein the computation unit (16) of the mobile data appliance (6) is configured to capture direction, speed, acceleration and/or duration of the movement and to initiate the wireless communication for transmitting the video signals when threshold values and/or a combination of various values for the direction, acceleration and/or duration of the movement is/are exceeded.

6. The system as claimed in claim 1, wherein the computation unit (16) of the mobile data appliance (6) is configured to capture direction, speed, acceleration and/or duration of the movement and to initiate the wireless communication for transmitting the video signals when threshold values and/or a combination of various values for the direction, acceleration and/or duration of the movement is/are exceeded.

7. The system as claimed in claim 1, wherein the computation unit (16) of the mobile data appliance (6) is configured to recognize connection to a wireless communication system of a motor vehicle and, in response to recognition of the connection, to present on the display (7) of the mobile data appliance (6) the frame (12) defining the display area (11), arranged in a central area, on which the image content of the mobile data appliance (6) is displayed, and to present, in the frame (12) that surrounds the display area (11), the information displays (13) that are available for wireless communication of the video signals.

8. The system as claimed in claim 1, wherein the computation unit of the one or more information displays (4) and/or a computation unit (19) of the communication unit (17) of the motor vehicle is/are configured to use the wireless communication to transmit, when the mobile data appliance (6) registers on the wireless communication system of the motor vehicle, a self-executing application program to the computation unit (16) of a mobile data appliance (6), which program is configured to set up the computation unit (16) of the mobile data appliance (6).

9. The system as claimed in claim 1, wherein the communication unit (17) has a computation unit (19), the communication unit (17) being configured to control a transmitter and a receiver in the wireless communication system, and the computation unit (19) of the communication unit (17) being configured to ascertain the position of the mobile data appliance (6) in the motor vehicle based on reception field strength of signals received from the mobile data appliance (6).

10. The system as claimed in claim 1, wherein data signals are transmitted in addition to the video signals.

11. A non-transitory computer-readable medium storing a computer program for setting up the computation unit (16) of the mobile data appliance (6) to actuate the one or more information displays (4) in a motor vehicle by video signals, using wireless communication by a wireless communication system of the motor vehicle, using the system as claimed in claim 1, and for setting up the computation unit (15) of the one or more information displays (4) to present for display the video signals received from the mobile data appliance (6), using the system as claimed in claim 1.

12. The non-transitory computer-readable medium as claimed in claim 11, wherein the computation unit (16) of the mobile data appliance (6) is configured as a master and the computation unit (15) of the one or more information displays (4) is configured as a slave.

13. The non-transitory computer-readable medium as claimed in claim 11, wherein the stored computer program sets up the computation unit (16) of the mobile data appliance (6) as a piece of self-executing application software and is transmitted to the computation unit (16) of the mobile data appliance (6) via the wireless communication system of the motor vehicle.

* * * * *